(12) United States Patent
Nazarian

(10) Patent No.: US 10,379,219 B1
(45) Date of Patent: Aug. 13, 2019

(54) MEASUREMENT SYSTEM USING CAMERA

(71) Applicant: ROCKLEY PHOTONICS LIMITED, London (GB)

(72) Inventor: Ara W. Nazarian, Newport Beach, CA (US)

(73) Assignee: Rockley Photonics Limited, London (GB)

( * ) Notice: Subject to any disclaimer, the term of this patent is extended or adjusted under 35 U.S.C. 154(b) by 608 days.

(21) Appl. No.: 14/843,866

(22) Filed: Sep. 2, 2015

Related U.S. Application Data

(60) Provisional application No. 62/059,653, filed on Oct. 3, 2014.

(51) Int. Cl.
G01C 3/08 (2006.01)
G01S 17/08 (2006.01)
G01B 17/00 (2006.01)
G01B 11/26 (2006.01)

(52) U.S. Cl.
CPC ............ G01S 17/08 (2013.01); G01B 11/26 (2013.01); G01B 17/00 (2013.01)

(58) Field of Classification Search
CPC combination set(s) only.
See application file for complete search history.

(56) References Cited

U.S. PATENT DOCUMENTS

2014/0104416 A1* 4/2014 Giordano ............... G01B 11/02
348/135

* cited by examiner

*Primary Examiner* — Samantha K Abraham
(74) *Attorney, Agent, or Firm* — Lewis Roca Rothgerber Christie LLP

(57) ABSTRACT

A system and method for displaying ranged measurements of objects within an image display is disclosed. Embodiments may use a range finding device to measure distances of objects from a user. Aspects of the subject technology may compensate for tilt of the object and/or of the device capturing the image.

7 Claims, 5 Drawing Sheets

MEASUREMENT SYSTEM USING CAMERA

CROSS-REFERENCE TO RELATED APPLICATIONS

This application claims benefit under 35 U.S.C. § 119(e) of U.S. Provisional Application having Ser. No. 62/059,653 filed Oct. 3, 2014, which is hereby incorporated by reference herein in its entirety.

BACKGROUND

The embodiments herein relate generally to systems for measuring objects using a camera.

Conventional equipment for measuring objects includes: measuring tape and distance measuring devices (such as laser systems, sound measuring systems). Measuring tapes requires a person to hold the tape from one end as the other end is fixed in place or held by another person to measure the size of an object which is a lot of work. There exists a smart phone app that measures the size of objects that requires placing a known/specific object next to the actual object that needs to be measured which is very inconvenient and takes more effort. The accuracy of this system may be undesirable. In addition, time is needed to input the data associated with the reference object before items can be measured.

As can be seen, there is a need for a system that can measure objects conveniently.

SUMMARY

According to one embodiment of the subject technology, a computer program product for measuring an actual size (A) of objects that appears tilted on an electronic display of an electronic device comprises a non-transitory computer readable storage medium having computer readable program code embodied therewith. The computer readable program code may be configured to, when executed by a processor: identify one or more tilted objects in one or more planes within a field of view of a camera coupled to the electronic display; point a scanning laser source and laser beam at a plurality of points on the identified tilted object; measure distances from the laser source to each of the plurality of points on the tilted object; determine the tilt angle of the tilted object relative to the laser source; and determine the actual size of the tilted object based on the measured distances of each of the plurality of points on the tilted object and the determined tilt angle of the tilted object relative to the laser source.

According to another embodiment of the subject technology, a system for measuring an actual size (A) of an object that appears tilted when displayed by a mobile electronic device including a camera, an electronic display, and a processor, comprises a housing configured for attachment to the mobile electronic device, the housing including a window over the camera; a scanning laser system coupled to the housing; a distance measuring device configured to receive a reflected laser beam from the object and calculate a distance from the a scanning laser system to the object; and a bus for providing distance measurements from the distance measuring device to the processor.

BRIEF DESCRIPTION OF THE FIGURES

The detailed description of some embodiments of the present invention is made below with reference to the accompanying figures, wherein like numerals represent corresponding parts of the figures.

DETAILED DESCRIPTION OF CERTAIN EMBODIMENTS

Broadly, embodiments of the subject technology provide a system and method for capturing images and measuring various dimensions for objects in the images.

Figure 1:
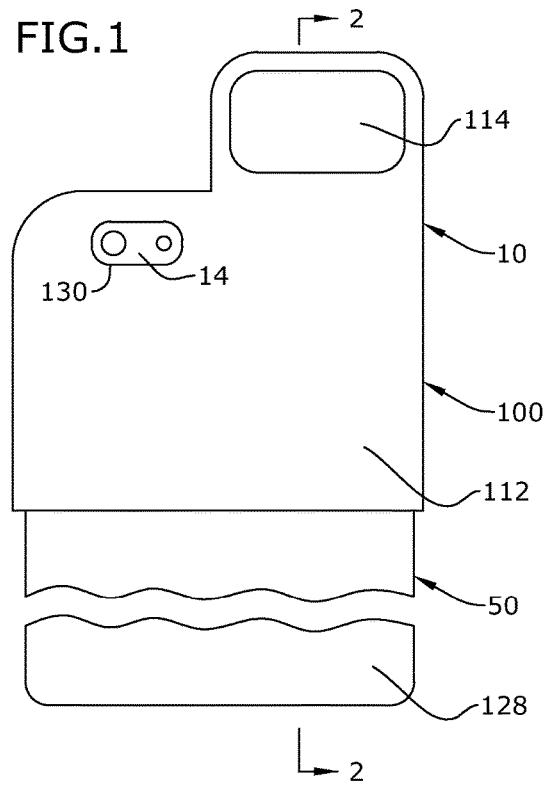
FIG. 1 is a rear broken view of a system for measuring an actual size of an object that appears tilted in an electronic display in accordance with an embodiment of the subject technology.
Figure 2:
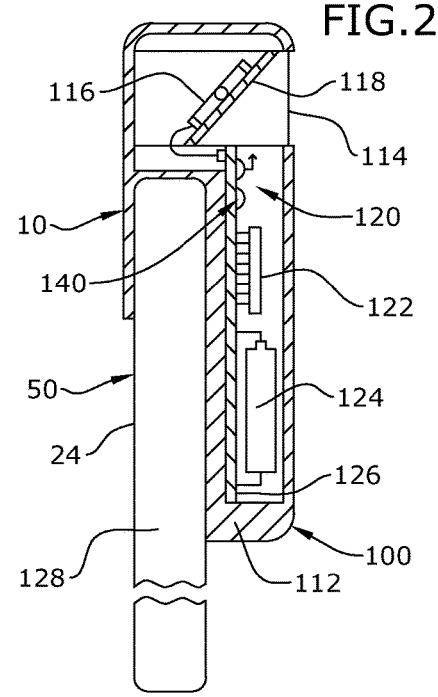
FIG. 2 is a cross-sectional side view of the system of FIG. 2.
Figure 3:
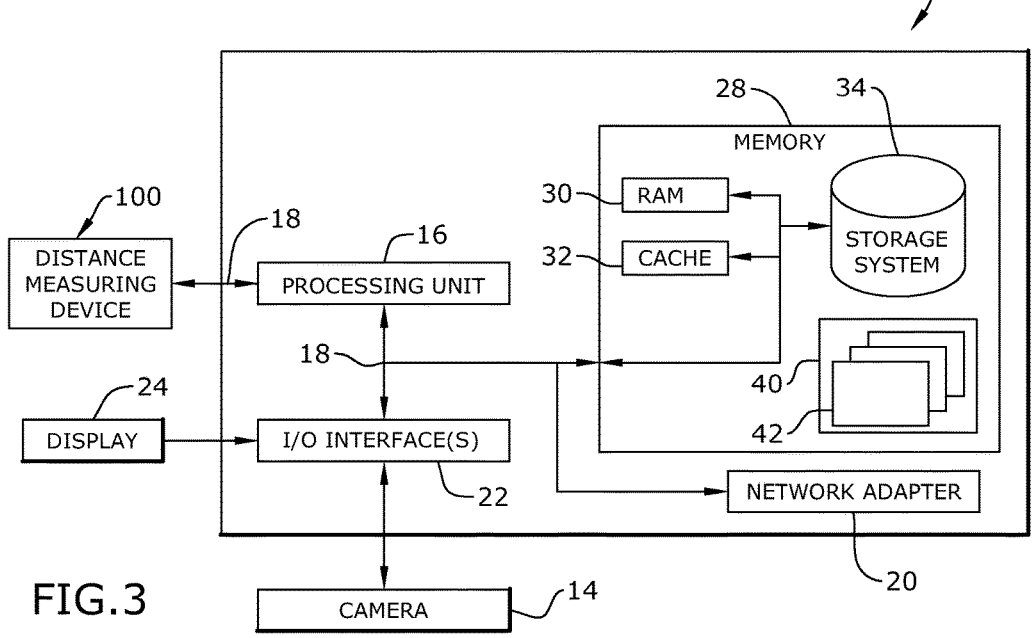
FIG. 3 is a block diagram showing general computing aspects of the system of FIG. 1 in accordance with an embodiment of the subject technology.

Referring now to FIGS. 1-3, front and side views and a schematic of an example of a system 10 is shown. The system 10 is generally configured to electronically capture images and discern objects within a captured image. Objects within the captured image may be laser scanned to provide multiple measurements as shown on an image display. The system 10 may generally include a mobile electronic device 50 and a laser scanning module 100.

The mobile electronic device 50 (referred to generally as the "device 50") may be for example, a smartphone, tablet device, and/or digital camera configured with the functions of a general-purpose computing device. The components of the device 50 may include, but are not limited to, one or more processors or processing units 16, a system memory 28, and a bus 18 that couples various system components including the system memory 28 to the processor 16. The device 50 may include camera 14, a display 24, and/or any network devices 20 (e.g., transceiver, network card, adapter, etc.) that enable the device 50 to communicate with one or more other computing devices. In embodiments, where the device 50 is a digital camera, the system 10 has built-in distance acquisition capability. Communication with the device 50 can occur via Input/Output (I/O) interfaces 22. It will be understood that in some embodiments, the device 50 may be described in the general context of computer system executable instructions, such as program modules, being executed by a computer system (described for example, below). The display 24 may show captured objects and measurements associated with captured objects.

The device 50 may typically include a variety of computer system readable media. Such media could be chosen from any available media including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device. The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

As will be appreciated by one skilled in the art, aspects of the disclosed invention may be embodied as a system, method or process, or computer program product. Accordingly, aspects of the disclosed invention may take the foam of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

The distance measuring device 100 may be any device that can measure the distance of an object from the device 50 which may include for example, a laser range finder, SONAR device, ultrasound device, RADAR device, video tracking, etc. In an exemplary embodiment, the distance measuring device 100 may be configured for retrofit onto or sliding onto an existing device 50 so that the camera 14 has a clear field of view when the system 10 is assembled. The distance measuring device 100 includes a housing 112 and a window 130 disposed in alignment with the camera 14 to provide the camera 14 with access to a field of view through the housing 112. The distance measuring device 100 in addition includes a laser source 120 aligned to emit a laser beam toward a movable mirror 118. The movable mirror 118 may be moved by a piezo-electric actuator 116. Control of the piezo-electric actuator 116 may be performed by a processor 122. The return path of the laser beam may hit the movable mirror 118 and be reflected to and detected by a sensor 140. The piezo-electric actuator 116, movable mirror 118, processor 122, and sensor 140 may be electrically connected to one another via PCB 126 and powered by power source 124 (for example, a battery or capacitor). A window 114 may be positioned in front of the movable mirror 118 for transmission of a scanning laser beam. In another embodiment, the sensor 140 may be positioned next to movable mirror 118 so that the return path of the laser beam comes through window 114 and hits the sensor 140 directly.

Figure 4:
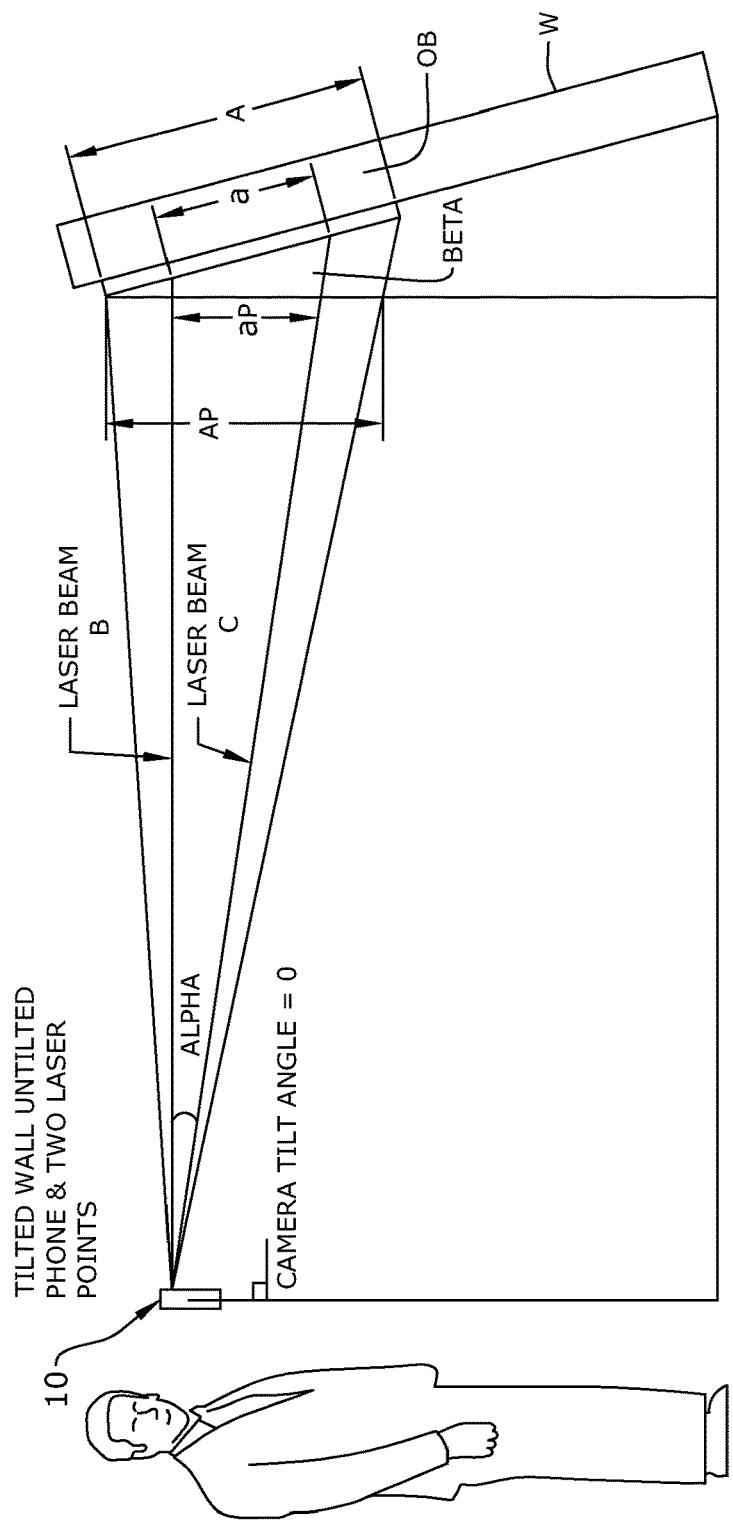
FIG. 4 is a schematic illustration for measuring the actual size of an object with compensation for tilt of the object with an un-tilted camera in accordance with an embodiment of the subject technology.
Figure 5:
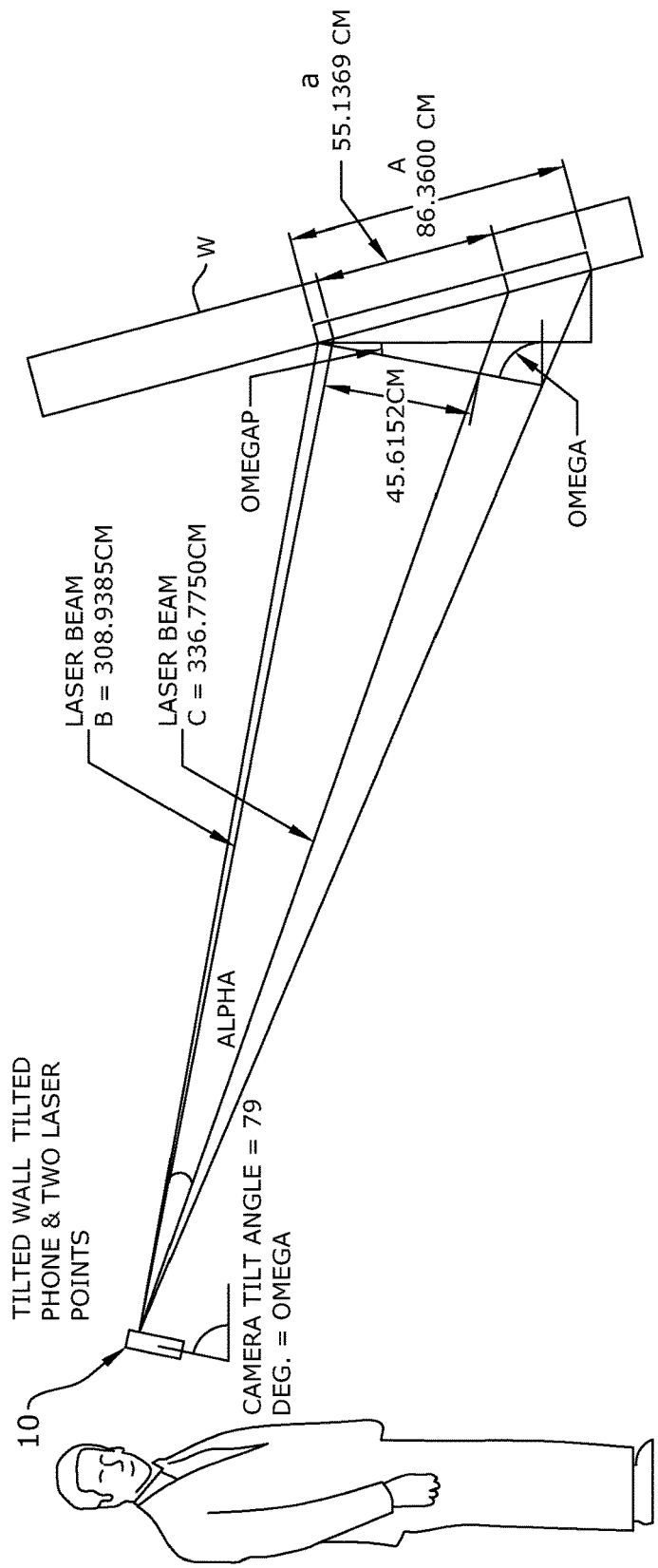
FIG. 5 is a schematic illustration for measuring the actual size of an object with compensation for tilt of the object and tilt of the camera in accordance with an embodiment of the subject technology.
Figure 6:
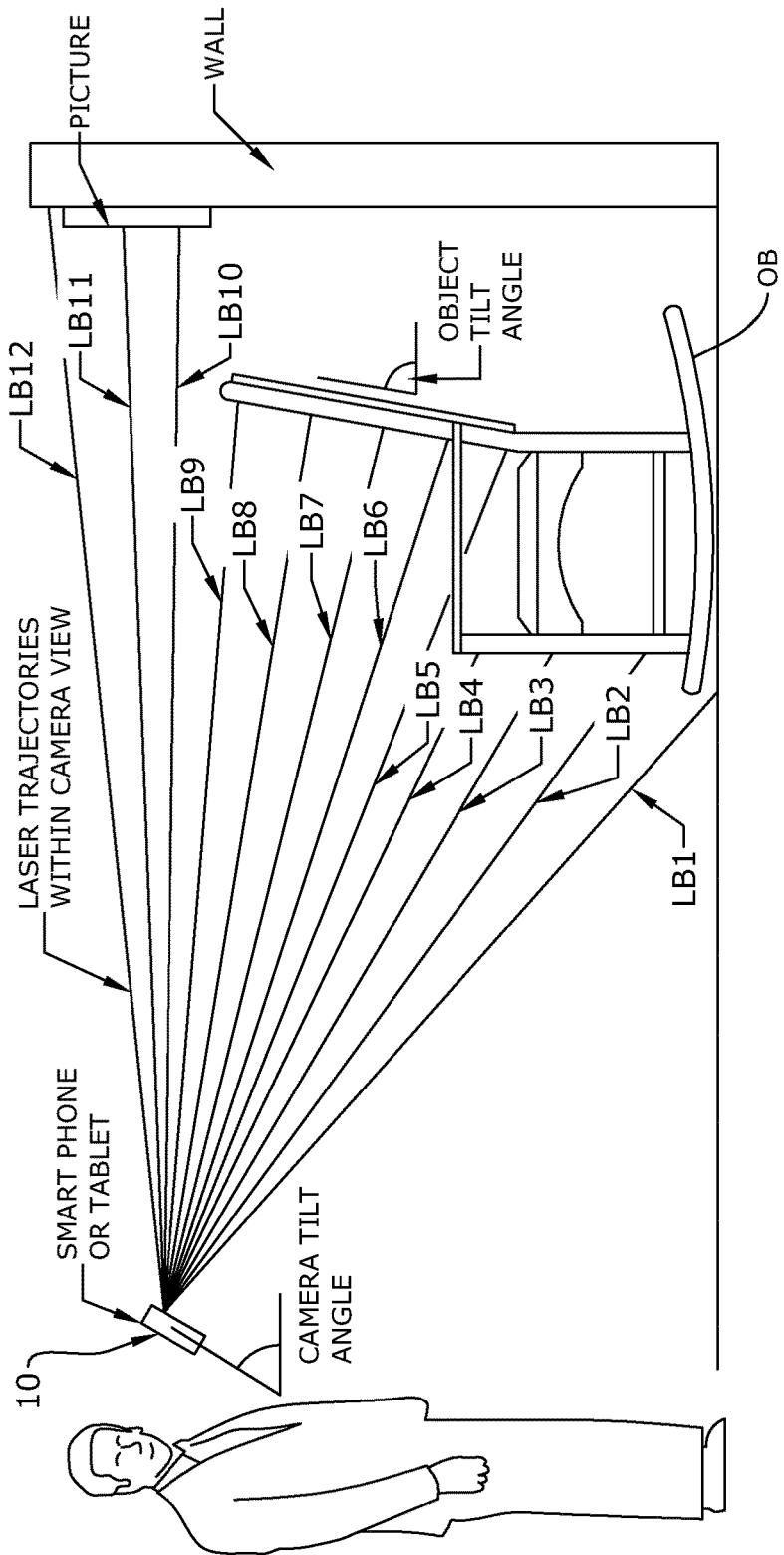
FIG. 6 is a schematic illustration for measuring the distance of multiple objects at different planes within field of view of camera with compensation for tilt in accordance with an embodiment of the subject technology.
Figure 7:
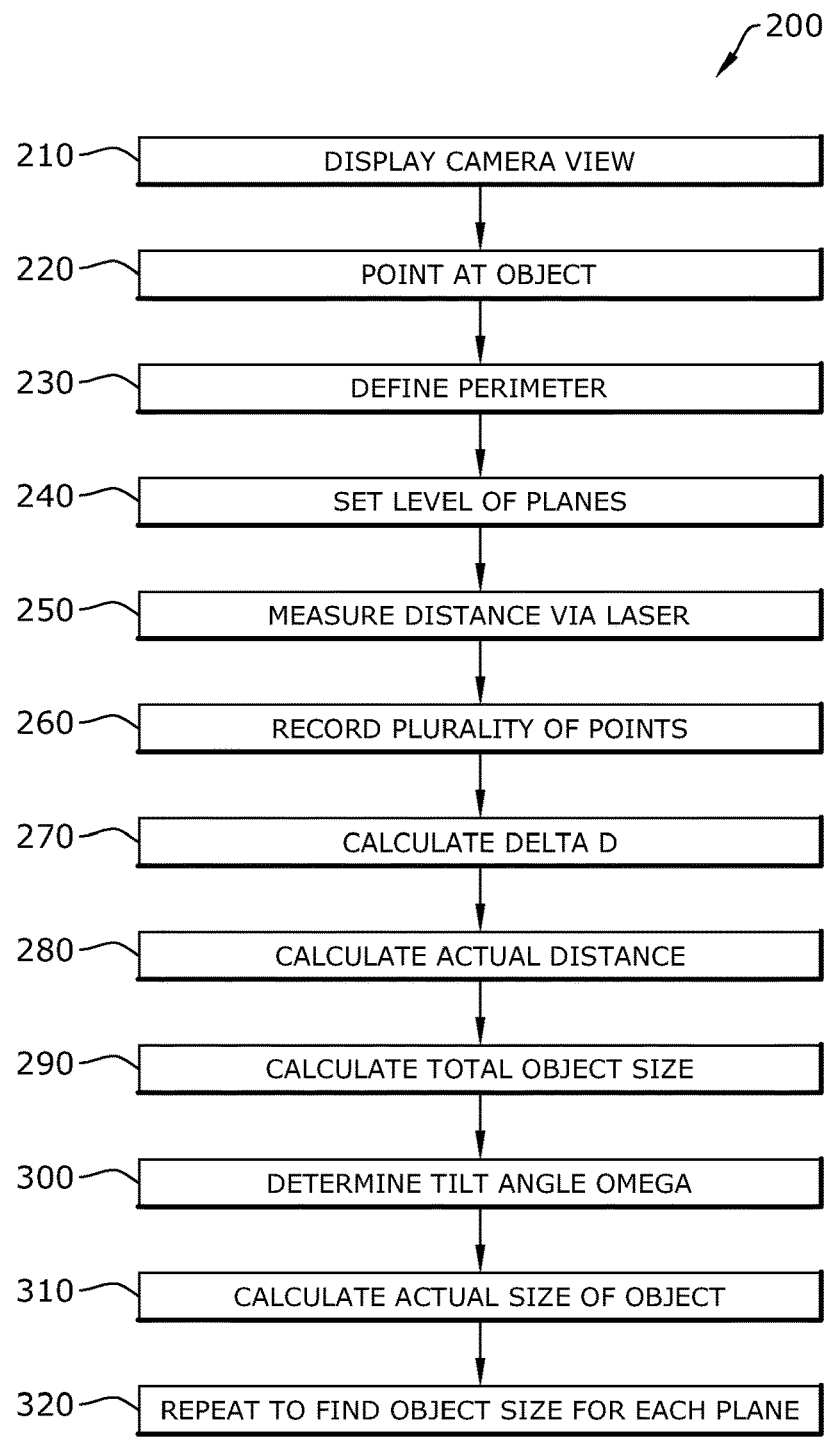
FIG. 7 is a flowchart of a method of measuring an actual size of objects using a scanning laser in accordance with an embodiment of the subject technology.

An exemplary use of the system 10 is shown in FIG. 4-6. FIGS. 4-6 may be referenced concurrently with FIG. 7 which includes a flowchart for a method 200 of measuring an actual size of objects in an electronic display. In some scenarios, objects may be perpendicular to the user/system 10. In this type of scenario, a single laser beam may be sufficient to measure an object. In an exemplary use, objects that are tilted may be measured for, for example, the actual size or distance of the objects. As may be appreciated, when tilted, the objects may appear smaller, closer or farther than their actual size or distance from the system 10. A laser scan of multiple points may in in any direction (for example, up/down, side to side, cross, square, circular, elliptical, etc.) Steps in the method 200 will be designated as block numbers in parentheses in the following description. References with alphabetic designations in parentheses refer to elements that are not part of the subject technology.

In FIGS. 4-5, a scenarios are shown in which the compensation for tilt angle of the system 10 and the object (OB) is shown as the source captures/displays (210) the image of an object (OB). In the example shown, the object (OB) (for example, a picture) and/or the system 10 may be tilted (or the object (OB) positioned on a wall (W) that is tilted) so that the image of the object (OB) appears tilted on an electronic display when the system 10 is pointed (220) at the object (OB). A user may decide how much to explore around the object (OB) depending on the shape and angle of the object (OB). In an exemplary embodiment, a distance measuring device in the system 10 may be pointed at a plurality of points on the object (OB). The perimeter of the object (OB) may be defined (230) on the image display. For example, opposite edges of the object (OB) image may be used to define the perimeter. In some embodiments, the number/level of planes being analyzed for objects may be set (240). The distance of a plurality of points on the object (OB) may be measured (250). For example, a first laser beam B may point at a first point on the object (OB). In some embodiments, the first laser beam B may be on a line perpendicular to the electronic device and/or parallel to a ground surface. A second laser beam B may be pointed at a second point on the object (OB). The first and second points may be intermediate the perimeter edges. In some embodiments, the laser beam C may be emitted at a known angle ($\alpha$) from laser beam B. The distance of each laser beam B and C may be measured by known range finding techniques. The distance for each point may be recorded (260). The difference $\Delta D$ between two points may be determined (270). For example, a displayed size (AP) of the object (OB) (total object size) may be measured (290) on the image display based on the distance of the perimeter points to the system 10 and the span of pixels used in the electronic image display and saved for use in calculations described below. A distance (aP) between the first point of the selected tilted object and the second point of the selected tilted object as the selected tilted object appears on the electronic display may be determined based on the same approach. An actual size or distance (a) of the distance between the first point of the selected tilted object and the second point of the selected tilted object may be determined (280) according to the formula, $$a = \sqrt{B^2 + C^2 - 2BC \cdot \cos(\alpha)}.$$

The actual size (A) of the selected tilted object may be determined (310) generally according to the formula, $$A=a*(AP/aP).$$

For instances with tilt involved, the camera's tilt angle may be determined (300) and used in the above formula according to the following. A tilt angle (ω) of the laser source relative to a gravity vector may be determined using for example, an accelerometer or other tilt detection device existing in the electronic mobile device. A tilt angle of the object (OB) may be calculated according to the formula, $$(\omega P)=90-\omega.$$

The actual size (A) of the selected tilted object with compensation for tilt may then be determined (310) according to the formula:

$$A=AP*(a/aP)/\COS(\omega P).$$

Referring now to FIG. 6, an exemplary embodiment may measure the depth/distance of objects, including tilted objects along multiple planes/levels of depth in the field of view. For example, the field of view in the image display may include an object (OB) such as a chair in the foreground and a picture hung on a wall in the background. Using techniques described above with respect to FIGS. 4-5 and 7, a laser scan of multiple beams (LB1-LB10) as shown may provide the distance of multiple objects simultaneously for display. As may be appreciated, the aforementioned techniques may discern surfaces perpendicular to the user holding the system 10 (for example, the picture) from surfaces at a tilt (for example, the backing of the rocking chair shown). In addition, the user's tilt of the system 10 may be compensated for.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A computer program product for measuring an actual size (A) of objects and compensating for tilt, the computer program product comprising a non-transitory computer readable storage medium having computer readable program code embodied therewith, the computer readable program code being configured to, when executed by a processor:
   identify one or more objects in one or more planes within a field of view of a camera coupled to an electronic display;
   point a scanning laser source and laser beam at a plurality of points on the identified one or more objects;
   measure distances from the laser source to each of the plurality of points on the identified one or more objects;
   determine a tilt angle of the identified one or more objects relative to the laser source;
   determine the actual size of the identified one or more objects based on the measured distances of each of the plurality of points on the identified one or more objects and the determined tilt angle of the identified one or more objects relative to the laser source;
   identify perimeter points on opposite sides of a selected one of the identified one or more objects as the selected identified one or more objects appears on the electronic display;
   determine a distance (AP) between the perimeter points as the selected identified one or more objects appears on the electronic display;
   determine a distance (aP) between a first point, of the plurality of points, the first point being on the selected identified one or more objects, and a second point, of the plurality of points, the second point being on the selected identified one or more objects, as the selected identified one or more objects appears on the electronic display;
   determine an actual size (a) of the distance between the first point, and the second point based on a distance B, a distance C, and a common angle between the first point, the second point, and the laser source, the distance B being the measured distance from the laser source to the first point, the distance C being the measured distance from the laser source to the second point; and
   determine the actual size (A) of the selected identified one or more objects based on the actual size (a) of the distance between the first point and the second point, the distance (AP) between the perimeter points as the selected identified one or more objects appears on the electronic display, and the distance (aP) between the first point and the second point as the selected identified one or more objects appears on the electronic display.

2. The computer program product of claim 1, wherein:
   the scanning laser source and laser beam are pointed at the first point on a line perpendicular to an electronic device comprising the electronic display;
   the scanning laser source and laser beam are pointed at the second point on a line at a known angle (α) from the laser source;
   the first and second points are intermediate the identified perimeter points;
   the actual size (a) of the distance between the first and the second point is determined according to the formula, $$a=\sqrt{B^2+C^2-2BC*\cos(\alpha)};\text{ and}$$

the actual size (A) of the selected identified one or more objects is determined according to the formula, $$A=a*(AP/aP).$$

3. The computer program product of claim 1, further comprising code configured to:
   determine a tilt angle (ω) of the laser source relative to a gravity vector;
   determine a tilt angle (ωP)=90−ω; and
   determine the actual size (A) of the selected identified one or more objects according to the formula:

$$A=AP*(a/aP)/\COS(\omega P).$$

4. The computer program product of claim 1, further comprising code configured to determine a number of the one or more planes in the field of view and determine the actual size of objects in each of the planes.

5. A system for measuring an actual size (A) of an object and for compensating for tilt when displayed by a mobile electronic device including a camera, an electronic display, and a processor, comprising:
   a housing configured for attachment to the mobile electronic device, the housing including a window over the camera;
   a scanning laser source coupled to the housing;
   a distance measuring device configured to receive a reflected laser beam from the object and calculate a distance from the scanning laser source to the object;
   a bus for providing distance measurements from the distance measuring device to the processor; and a computer program product for measuring the actual size (A) of objects and for compensating for tilt when displayed on the electronic display, the computer program product comprising a non-transitory computer readable storage medium in the mobile electronic device having computer readable program code embodied therewith, the computer readable program code being configured to, when executed by the processor:

identify one or more objects in one or more planes within a field of view of the camera;

point the scanning laser source and laser beam at a plurality of points on the identified one or more objects;

measure distances from the laser source to each of the plurality of points on the identified one or more objects;

determine a tilt angle of the identified one or more objects relative to the laser source;

determine the actual size of the identified one or more objects based on the measured distances of each of the plurality of points on the identified one or more objects and the determined tilt angle of the identified one or more objects relative to the laser source; and identify perimeter points on opposite sides of a selected one of the identified one or more objects as the selected identified one or more objects appears on the electronic display;

determine a distance (AP) between the perimeter points as the selected identified one or more objects appears on the electronic display;

determine a distance (aP) between a first point, of the plurality of points, the first point being on the selected identified one or more objects, and a second point, of the plurality of points, the second point being on the selected identified one or more objects, as the selected identified one or more objects appears on the electronic display;

determine an actual size (a) of the distance between the first point and the second point based on a distance B, a distance C, and a common angle between the first point, the second point, and the laser source, the distance B being the measured distance from the laser source to the first point, the distance C being the measured distance from the laser source to the second point; and determine the actual size (A) of the selected identified one or more objects based on the actual size (a) of the distance between the first point and the second point, the distance (AP) between the perimeter points as the selected identified one or more objects appears on the electronic display, and the distance (aP) between the first point and the second point as the selected identified one or more objects appears on the electronic display.

6. The system of claim 5, wherein:

the scanning laser source and laser beam are pointed at the first point on a line perpendicular to the electronic device;

the scanning laser source and laser beam are pointed at the second point on a line at a known angle ($\alpha$) from laser source;

the first and second points are intermediate the identified perimeter points;

the actual size (a) of the distance between the first point and the second point is determined according to the formula, $$a=\sqrt{B^2+C^2-2BC*\cos(\alpha)};$$ and the actual size (A) of the selected identified one or more objects is determined according to the formula, $$A=a*(AP/aP).$$

7. The system of claim 6, further comprising code configured to:

determine a tilt angle ($\omega$) of the laser source relative to a gravity vector;

determine a tilt angle ($\omega P$)=90−$\omega$; and determine the actual size (A) of the selected identified one or more objects according to the formula:

$$A=AP*(a/aP)/\cos(\omega P).$$

* * * * *